United States Patent
Huang et al.

(10) Patent No.: US 10,854,182 B1
(45) Date of Patent: Dec. 1, 2020

(54) SINGING ASSISTING SYSTEM, SINGING ASSISTING METHOD, AND NON-TRANSITORY COMPUTER-READABLE MEDIUM COMPRISING INSTRUCTIONS FOR EXECUTING THE SAME

(71) Applicant: ATEN INTERNATIONAL CO., LTD., New Taipei (TW)

(72) Inventors: Hsien-Chao Huang, New Taipei (TW); Yi-Tzu Ting, New Taipei (TW); Yu-Yun Chen, New Taipei (TW); Chung-Wen Yang, New Taipei (TW)

(73) Assignee: ATEN INTERNATIONAL CO., LTD., New Taipei (TW)

( * ) Notice: Subject to any disclaimer, the term of this patent is extended or adjusted under 35 U.S.C. 154(b) by 0 days.

(21) Appl. No.: 16/716,739

(22) Filed: Dec. 17, 2019

(30) Foreign Application Priority Data

Dec. 16, 2019 (TW) .............................. 108146063 A

(51) Int. Cl.
| | |
|---|---|
| G10H 1/36 | (2006.01) |
| G06F 16/60 | (2019.01) |
| G10L 25/90 | (2013.01) |
| G10L 13/033 | (2013.01) |

(52) U.S. Cl.
CPC .............. G10H 1/366 (2013.01); G06F 16/60 (2019.01); G10L 13/0335 (2013.01); G10L 25/90 (2013.01); G10L 2025/906 (2013.01)

(58) Field of Classification Search
CPC ......... G10L 19/02; G10L 19/00; G10L 25/90; G10L 21/0356; G10L 2025/906; G10L 21/003; G10L 13/033; G10L 15/063; G10L 13/0335; G10H 1/366; G10H 2210/331; G10H 1/20; G10H 3/125; G10H 2210/066; G10H 2210/076; G10H 2210/031; G10H 2220/155; G10H 2250/615; G10H 1/0091; G10H 1/361; G10H 2240/125
See application file for complete search history.

(56) References Cited

U.S. PATENT DOCUMENTS

| | | | | |
|---|---|---|---|---|
| 5,542,000 A | * | 7/1996 | Semba | G10H 1/363 381/61 |
| 5,749,065 A | * | 5/1998 | Nishiguchi | G10L 19/18 704/200.1 |
| 6,438,517 B1 | * | 8/2002 | Yeldener | G10L 19/02 704/208 |
| 2004/0111171 A1 | * | 6/2004 | Jang | H04S 7/30 700/94 |
| 2006/0165240 A1 | * | 7/2006 | Bloom | G10H 1/366 381/56 |
| 2011/0282675 A1 | * | 11/2011 | Nagel | G10L 19/24 704/500 |
| 2013/0019738 A1 | * | 1/2013 | Haupt | G10L 21/013 84/622 |
| 2013/0090934 A1 | * | 4/2013 | Nagel | G10L 19/18 704/500 |

* cited by examiner

*Primary Examiner* — Marlon T Fletcher
(74) *Attorney, Agent, or Firm* — Birch, Stewart, Kolasch & Birch LLP

(57) ABSTRACT

A singing assisting system, a singing assisting method, and a non-transitory computer-readable medium including instructions for executing the method are provided. When the performed singing track does not appear in an ought-to-be-performed period, a singing-continuing procedure is executed. When the performed singing track is off pitch, a pitch adjustment procedure is executed.

21 Claims, 9 Drawing Sheets

SINGING ASSISTING SYSTEM, SINGING ASSISTING METHOD, AND NON-TRANSITORY COMPUTER-READABLE MEDIUM COMPRISING INSTRUCTIONS FOR EXECUTING THE SAME

CROSS-REFERENCE TO RELATED APPLICATION

This non-provisional application claims priority under 35 U.S.C. § 119(a) to Patent Application No. 108146063 filed in Taiwan, R.O.C. on Dec. 16, 2019, the entire contents of which are hereby incorporated by reference.

BACKGROUND

Technical Field

The instant disclosure relates to a smart assisting technology, in particular, to a singing assisting system, a singing assisting method, and a non-transitory computer-readable medium comprising instructions for executing the same.

Related Art

Singing devices known to the inventor(s) are provided for the user to adjust the tone of the accompaniment track when playing. However, the singing devices known to the inventor(s) cannot solve the issues when a user's singing is off the pitch (off key). Moreover, during singing, when the user forgets the lyrics or the melodies, the singing devices known to the inventor(s) can merely play the original singing track to help the user singing the song (namely, the singing guide mode), which may be useful for practicing but may be useless for performing.

SUMMARY

In view of these problems, one or some embodiments of the instant disclosure provide a singing assisting system, a singing assisting method, and a non-transitory computer-readable medium comprising instructions for executing the singing assisting method.

In one embodiment, the singing assisting system comprises a sound receiving device, a processing device, and a player device, and the singing assisting method is related to a singing-continuing procedure. The sound receiving device is adapted to receive a performed singing track. The processing device is adapted to detect if the performed singing track appears in an ought-to-be-performed period, if not, the processing device executes a singing-continuing procedure. The singing-continuing procedure is executed by being accompanied with an acoustics model comprising an encoder and a decoder. The acoustics model can be trained by training data regarding the original singer to obtain an original-singer acoustics model, and the acoustics model can be trained by training data regarding the user to obtain a user acoustic model. The singing-continuing procedure comprises converting an original-singer sound segment into an original-singer acoustics feature; inputting the original-singer acoustics feature to an encoder of an original-singer acoustics model; receiving an output of the encoder of the original-singer acoustics model by a decoder of a user acoustics model; obtaining a user acoustics feature from an output of the decoder of the user acoustics model; and converting the user acoustics feature into a synthesized singing track by a vocoder. The player device is adapted to output the synthesized singing track.

In one embodiment, the singing assisting system comprises a sound receiving device, a processing device, and a player device, and the singing assisting method is related to a pitch adjustment procedure. The sound receiving device is adapted to receive a performed singing track. The processing device is adapted to determine if a performed pitch of the performed singing track is in consistent with the original-singer pitch of an original-singer singing track, if not, the processing device executes a pitch adjustment procedure. The pitch adjustment procedure is executed by being accompanied with a pitch model comprising a second encoder and a second decoder. The pitch model can be trained by the original-singer training data to obtain an original-singer pitch model, and the pitch model can be trained by the user training data to obtain the user pitch model. The pitch adjustment procedure comprises converting the performed singing track into a user sound spectrum; converting the original-singer singing track into an original-singer sound spectrum; inputting the user sound spectrum to an encoder of a user pitch model to obtain a user acoustics feature; inputting the original-singer sound spectrum to an encoder of an original-singer pitch model to obtain an original-singer fundamental frequency; inputting the user acoustics feature and the original-singer fundamental frequency to a decoder of the user pitch model; obtaining an adjusted user sound spectrum from an output of the decoder of the user pitch model; and converting the adjusted user sound spectrum into a pitch-adjusted performed singing track. The player device is adapted to output the synthesized singing track.

Accordingly, based on one or some embodiments of the instant disclosure, by detecting if the user performs singing in the ought-to-be-performed period to determine the singing-continuing procedure should be performed or not, a continuing singing can be automatically provided using the sound of the user when the user forgets the lyrics or stop singing for some reasons. By applying the singing-continuing procedure, the produced continuing singing can maintain the pitch of the original singer; furthermore, since the acoustics model has an autoencoder structure, the produced continuing singing can have the timbre of the user. Moreover, by detecting the pitch of the performed singing of the user, the pitch adjustment procedure can be executed when the user is off the pitch. By executing the pitch adjustment procedure, the pitch of the user can be automatically adjusted; further more, since the pitch model has an autoencoder structure, the performed singing can have the timbre of the user.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
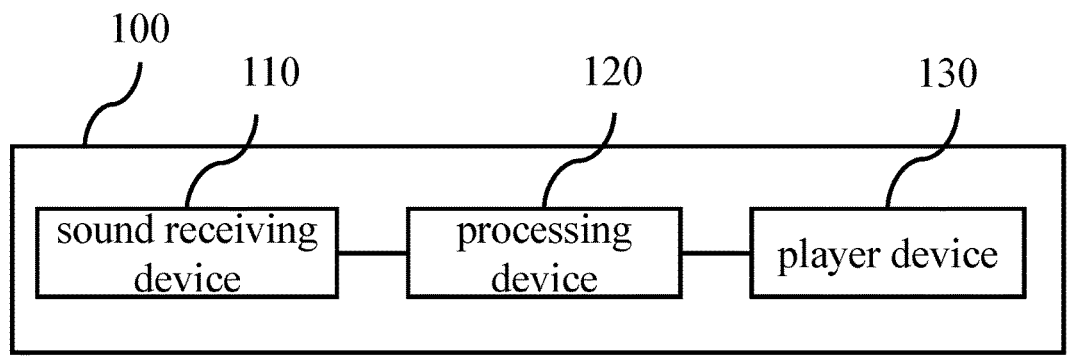
FIG. 1 illustrates a schematic block diagram of a singing assisting system according to one embodiment of the instant disclosure.

Please refer to FIG. 1, illustrating a schematic block diagram of a singing assisting system 100 according to one embodiment of the instant disclosure. In this embodiment, the singing assisting system 100 comprises a sound receiving device 110, a processing device 120, and a player device 130 sequentially connected to each other. The sound receiving device 110 and the processing device 120 may be connected with each other through wired (e.g., via wires, via cables complying with a specific communication protocol (such as universal serial bus (USB)) or wireless (e.g., via Bluetooth or via wireless networks) communications. Similarly, the player device 130 and the processing device 120 may be connected with each other through wired (e.g., via wires or cables) or wireless (e.g., via Bluetooth or wireless networks) communications.

The sound receiving device 110 is adapted to retrieve a performed singing track of a user, and the sound receiving device may comprise a single microphone or may comprise a plurality of microphones (for example, a microphone array). The microphone may be a dynamic microphone, a condenser microphone, a microelectromechanical systems (MEMS) microphone, etc.

Figure 2:
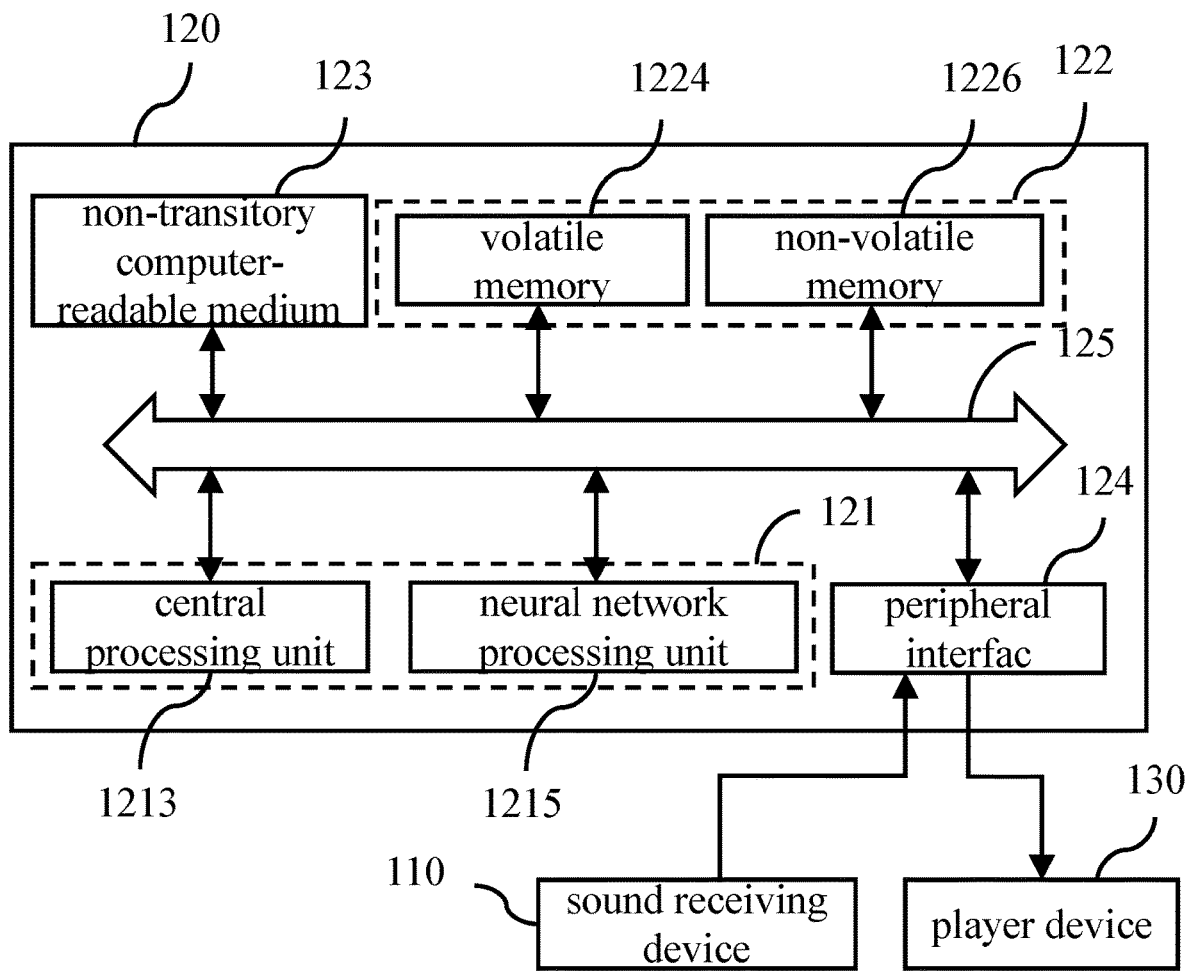
FIG. 2 illustrates a schematic block diagram of a processing device according to one embodiment of the instant disclosure.
Figure 3:
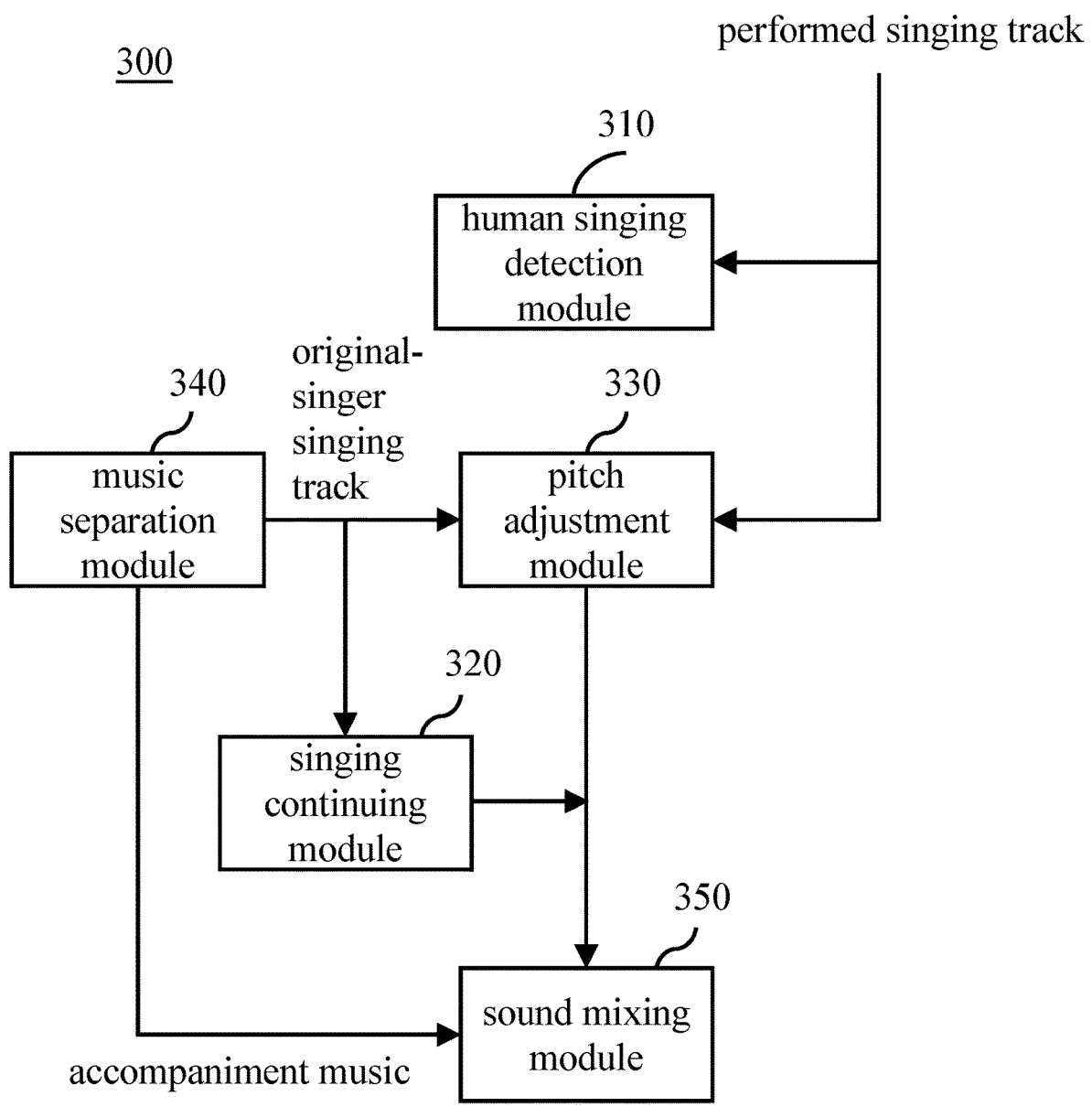
FIG. 3 illustrates a schematic block diagram of a computer program product for executing a singing assisting method according to one embodiment of the instant disclosure.

The processing device 120 selectively performs a singing assisting procedure (namely, a singing assisting method) to the performed singing track retrieved by the sound receiving device 110, and the procedure will be described in the following paragraphs. The processing device 120 may be one or more computer system with computation ability; for example, the processing device 120 may be a personal computer, a notebook computer, a smart phone, a tablet computer, a sever cluster, etc. Please refer to FIG. 2. FIG. 2 illustrates a schematic block diagram of the processing device 120 according to one embodiment of the instant disclosure. The processing device 120 has a processor 121, a memory 122, a non-transitory computer-readable medium 123, a peripheral interface 124 adapted to connect to the sound receiving device 110 and the player device 130, and a bus 125 adapted to allow the components of the processing device 120 to communicate with each other. The bus 125 may comprise, but not limited to, a system bus, a memory bus, a peripheral bus, or one or more combinations thereof. The processor 121 may comprise, but not limited to, a central processing unit (CPU) 1213 and a neural network processing unit (NPU) 1215. The memory 122 may comprise, but not limited to, a volatile memory 1224 (for example, a random access memory(RAM)) and a non-volatile memory 1226 (for example, a read-only memory (ROM)). The non-transitory computer-readable medium 123 may be, for example, a hard drive, a solid-state hard drive (SSD), etc., for storing a computer program product 300 (as shown in FIG. 3) comprising a plurality of instructions. Hence, when the processor 121 of the computer system executes the instructions, the computer system executes the singing assisting method.

Please refer to FIG. 1. The player device 130 is adapted to play the performed singing track in which the assisting singing procedure has been executed or not been executed by the processing device 120. The player device may comprise one or more speakers. The speaker may be a dynamic speaker, a balanced armature speaker, etc.

In some embodiments, any two of the sound receiving device 110, the processing device 120, and the player device 130 may be implemented as one component. For example, the sound receiving device 110 and the player device 130 may be the same device in an earphone microphone. In another example, the sound receiving device 110 and the processing device 120 may be the same device in a smart phone and connected to an external player device 130. Alternatively, in one example, the player device 130 and the processing device 120 may be the same device in a personal computer and connected to an external sound receiving device 110. In a further example, the sound receiving device 110, the processing device 120, and the player device 130 may be the same device in a notebook computer.

In some embodiments, the sound receiving device 110, the processing device 120, and the player device 130 may be separated devices. For example, the processing device 120 is a personal computer, and the personal computer is connected to an external sound receiving device 110 and an external player device 130.

In some embodiments, the processing device 120 comprises two or more computer systems, for example, a personal computer and a server, in which the server provides the singing assisting procedure. The personal computer may have a built-in/external sound receiving device 110 and a built-in/external player device 130, and the performed singing track can be transmitted to the server through network for processing, and the processed performed singing track are sent back to the personal computer by server through network.

Figure 4:
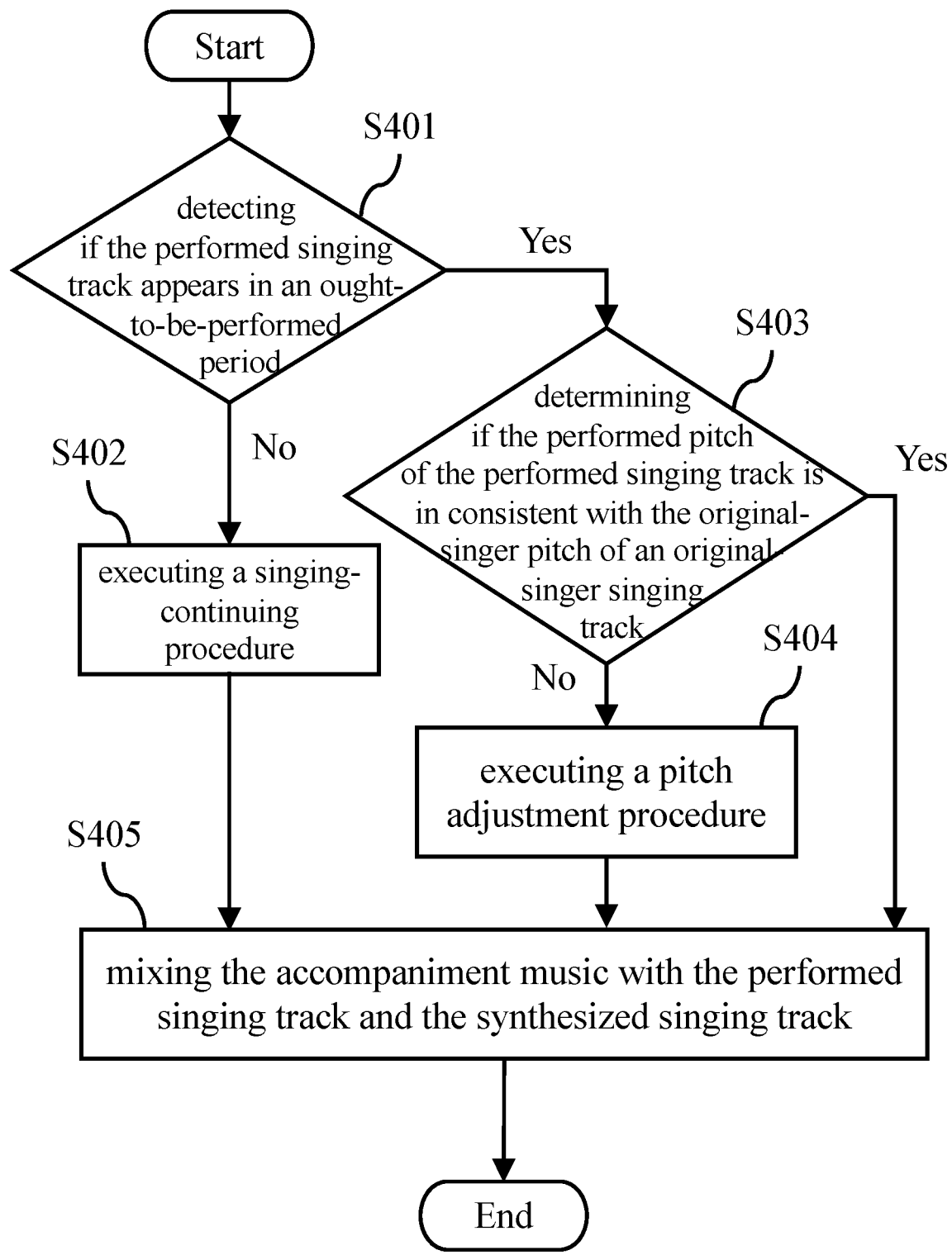
FIG. 4 illustrates a flowchart of a singing assisting method according to one embodiment of the instant disclosure.

Please refer to FIGS. 3 and 4. FIG. 3 illustrates a schematic block diagram of a computer program product 300 for executing a singing assisting method according to one embodiment of the instant disclosure. FIG. 4 illustrates a flowchart of a singing assisting method according to one embodiment of the instant disclosure. In this embodiment, the computer program product 300 comprises a human singing detection module 310, a singing-continuing module 320, a pitch adjustment module 330, a music separation module 340, and a sound mixing module 350.

Firstly, the music separation module 340 performs separation to a song file that a user is to perform with, namely, the music separation module retrieves the accompaniment music and the singing track of an original singer (hereinafter, original-singer singing track) from the song. The music separation module 340 may be implemented by algorithms like robust principal component analysis (RPCA), repeating pattern extraction technique (REPET), convolutional neural networks (CNN), deep recurrent neural networks (DRNN), etc. In the examples where the RPCA or the REPET are used, the accompaniment music in the song is assumed to appear repeatedly (since the sounds of the instrument are more regular as compared with the sounds of human beings), and the two algorithms are applied to figure out the repeated parts from the song. Hence, the repeated parts (i.e., the accompaniment music) can be separated from the song, and the human singing track can be figured out, thereby the human singing track and the accompaniment music can be separated from each other. The CNN algorithm and the DRNN algorithm use deep-learned neural network model to separate the accompaniment music and the human singing track from each other; in other words, the given input for the neural network model is a singing track with accompaniment music, and then the parameter of the neural network model obtained by deep learning can be outputted automatically to be a pure accompaniment music track and a pure human singing track. Specifically, in this embodiment, the neural network model can be trained to allow the neural network learning how to separate the human singing track from the song in a precise manner.

In the step S401, the human singing detection module 310 detects the sound (the performed singing track) received by the sound receiving device 110 so as to detect if the performed singing track appears in an ought-to-be-performed period. The ought-to-be-performed period may be obtained according to the time interval where the original-singer singing track appears. The human singing detection module 310 may be impelemented by algorithms like classification and regression tree (CART), voice activity detection (VAD), VadNet, etc. If the performed singing track does not appear in the ought-to-be-performed period, the step S402 is executed; if the performed singing track appears in the ought-to-be-performed period, the step S403 is executed.

In the step S402, the singing-continuing module 320 executes a singing-continuing procedure which will be described in the following paragraphs, so that the singing-continuing procedure can generate a singing track ought to be performed (hereinafter, synthesized singing track), thereby providing aids for the condition of forgetting lyrics.

In the step S403, the pitch adjustment module 330 determines if the pitch of the performed singing track (hereinafter, performed pitch) is in consistent with the pitch of the original-singer singing track (hereinafter, original-singer pitch). If the pitches are in consistent with each other, the step S404 is executed; if the pitches are not in consistent with each other, the step S405 is executed.

The determination of whether the pitches are in consistent with each other or not using the pitch adjustment module 330 may be implemented by algorithms like normalized cross correlation algorithm, polyphonic pitch detection algorithm, etc. In these approaches, waveforms which appear repeatedly are figured out from the sound track, and the time interval between the appearing times of the waveforms are calculated to obtain the required time for each of the waveforms (namely, the period of the waveform), thereby the pitch (audio frequency) of the sound track can be calculated using the periods of the waveforms. Accordingly, the pitch of the original singer and the pitch of the user can be figured out and compared wither each other (for example, by subtraction), to determine if the pitches are in consistent with each other or not. If the pitches are determined to be in consistent with each other, the pitch of the original singer is equal to the pitch of the user; if the pitches are determined not to be in consistent with each other, the pitch of the of the original singer is not equal to the pitch of the user. Embodiments are not limited thereto. In some embodiments, open source software such as "World" or "Straight" may be applied to retrieve the human pitch for comparison. In other words, any of these open source software may convert the human pitch into a sound parameter for subsequent comparisons.

In the step S404, the pitch adjustment module 330 executes a pitch adjustment procedure which will be described in the following paragraphs so as to adjust the performed pitch back to the original-singer pitch. Hence, the off-key condition can be improved.

In the step S405, the sound mixing module 350 mixes the accompaniment music separated from the music separation module 340, with the performed singing track which is not needed to be adjusted, with the synthesized singing track generated in the step S402, or with the performed singing track in which the pitch is adjusted, and the mixed track is outputted by the player device 130.

Figure 5:
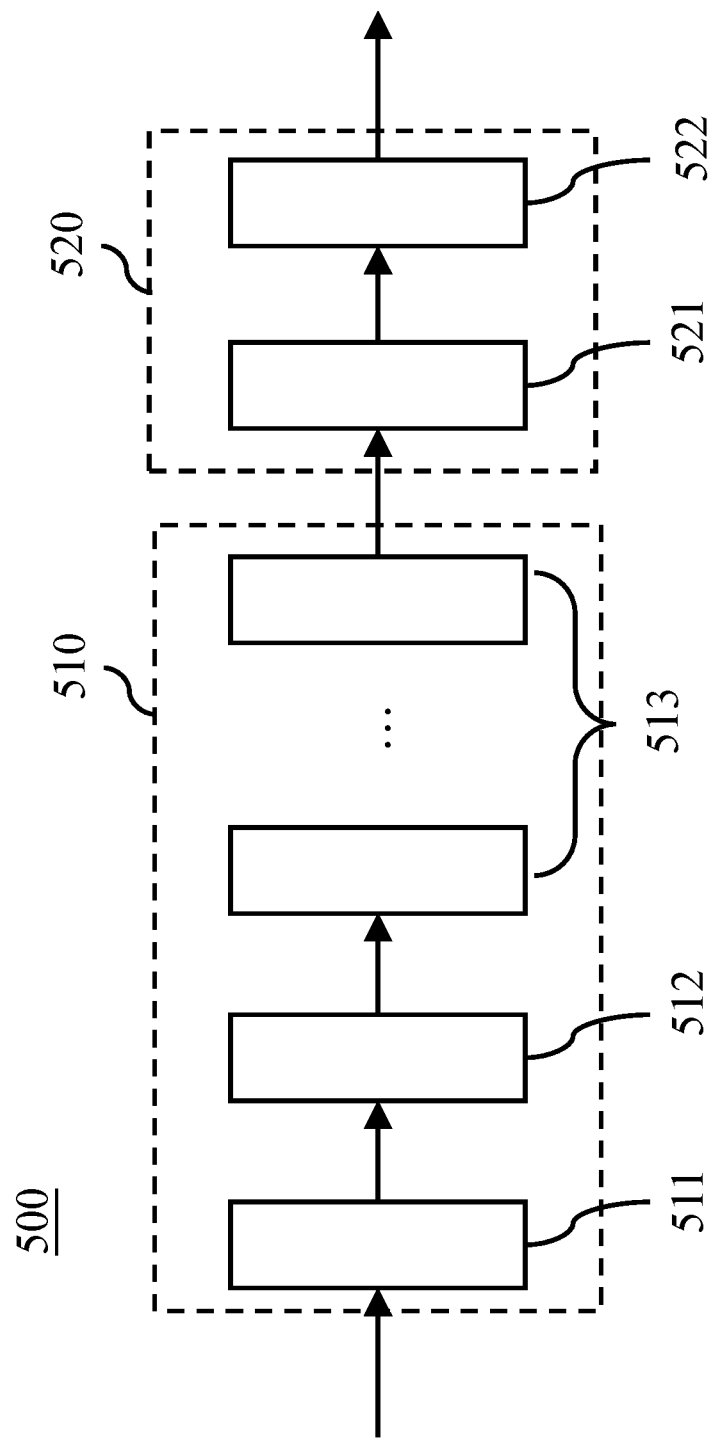
FIG. 5 illustrates a schematic block diagram of an acoustics model according to one embodiment of the instant disclosure.

The acoustics model used in the singing-continuing procedure is introduced prior to the introduction of the singing-continuing procedure. Please refer to FIG. 5, illustrating a schematic block diagram of an acoustics model 500 according to one embodiment of the instant disclosure. In this embodiment, the acoustics model 500 is a neural network model with supervised learning mode, and the acoustics model 500 comprises an encoder 510 and a decoder 520. In other words, in this embodiment, the acoustics model 500 has an autoencoder structure. The encoder 510 is adapted to convert an inputted acoustics feature into a feature vector, while the decoder 520 is adapted to convert the feature vector into an acoustics feature. After a plenty of training data (for example, sounds with texts) of a certain person is inputted to the acoustics model 500, weighting parameters can be converged, and the weighting parameters are accompanied with the acoustics model 500 to be a trained acoustics model 500 corresponding to the certain person, where the training data is a plenty of sound tracks of the certain person. For example, if a plenty of sound data regarding a user (i.e., the training data of the user) is provided as the training data, the acoustics model 500 can be trained as a user acoustics model 500; conversely, if a plenty of sound data of a singer (i.e., the training data of the original singer) is provided as the training data, the acoustics model 500 can be trained as an original-singer acoustics model 500. In other words, acoustics models 500 with different weighting parameters can be trained by using training data regarding different person. Moreover, in some embodiments, the acoustic model may be established by certain personnel, by inputting a plenty of words or phrases by speaking or by inputting a plenty of songs by singing in a real-time manner.

In some embodiments, as shown in FIG. 5, the encoder 510 comprises a convolution layer 511, a gated linear unit (GLU) 512, and a six-layered residual block 513; conversely, and the decoder 520 comprises a deconvolution layer 521 and a gated linear unit 522. However, it is understood that the components of the encoder 510 and the decoder 520 are not limited to the foregoing elements and combinations.

Figure 6:
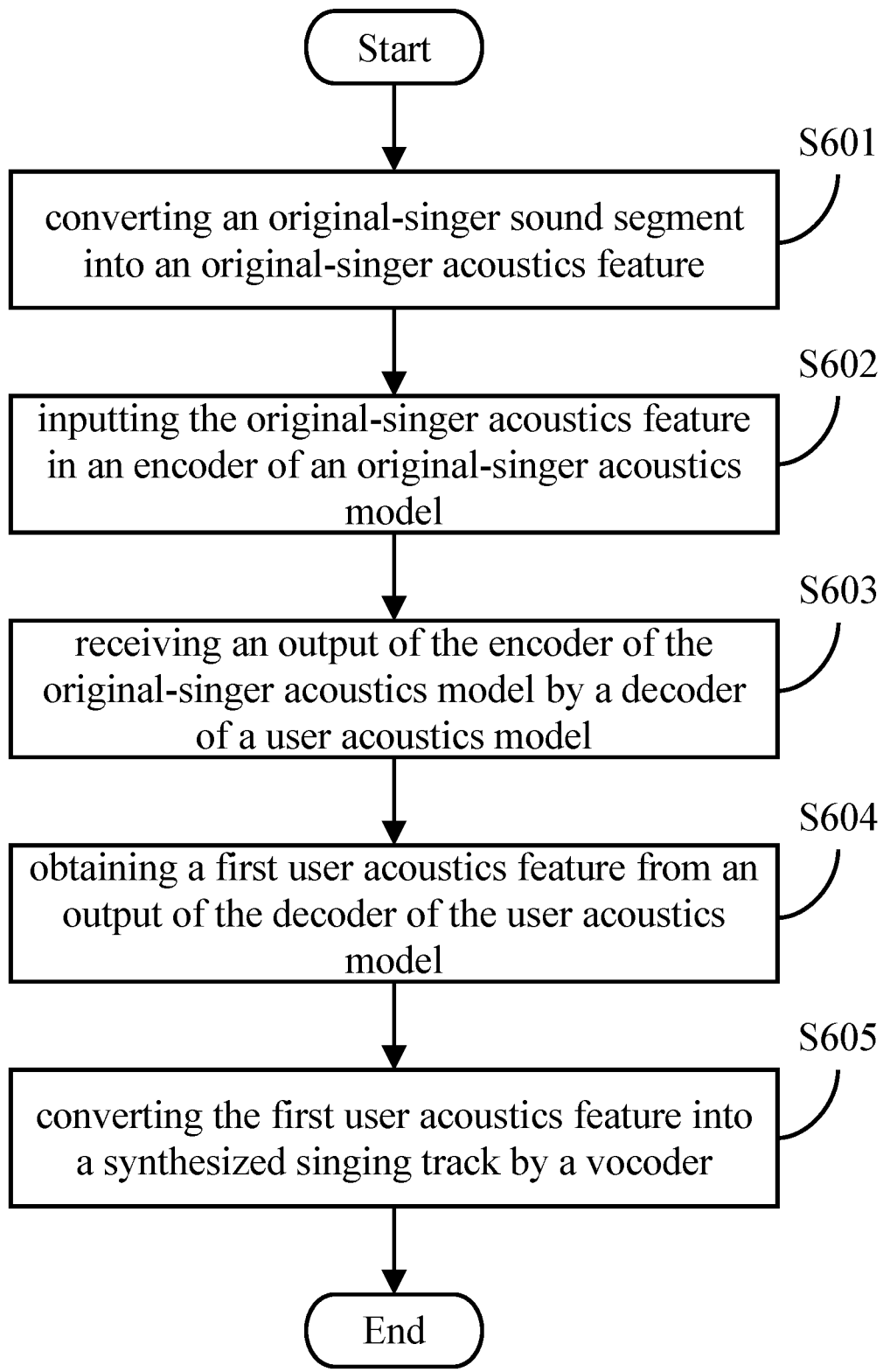
FIG. 6 illustrates a flowchart of a singing-continuing procedure according to one embodiment of the instant disclosure.

Please refer to FIG. 6, illustrating a flowchart of a singing-continuing procedure according to one embodiment of the instant disclosure. In the step S601, the original-singer sound segment is converted into an acoustics feature (hereinafter, original-singer acoustics feature). In this embodiment, the original-singer acoustics feature may be the Mel frequency cepstral coefficients (MFCCs), but embodiments are not limited thereto; the original-singer acoustics feature may be, for example, the spectral envelope, the fundamental frequency, and the aperiodicity. In this embodiment, a pre-processing may be applied to the original-singer sound segment, for example, the original-singer singing track and the accompaniment music are separated, so that just the original-singer singing track is processed to perform the acoustics feature conversion.

Figure 7:
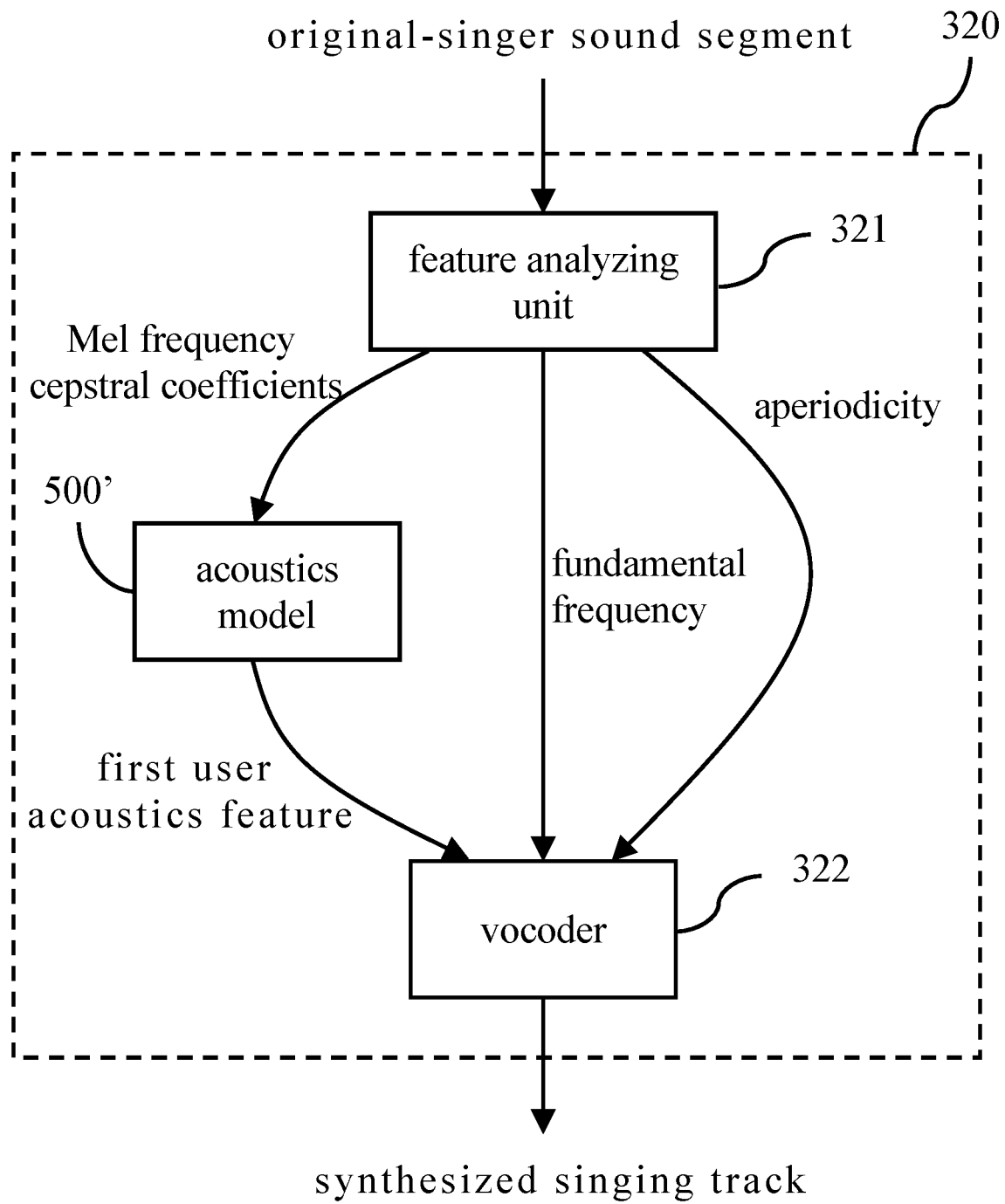
FIG. 7 illustrates a schematic block diagram of a singing-continuing module according to one embodiment of the instant disclosure.

In the step S602, the original-singer acoustics feature is inputted to the encoder 510 of the original-singer acoustics model 500; since the original-singer acoustics model 500 has weighting parameters corresponding to the original singer, the encoder 510 can output a feature vector corresponding to the original-singer acoustics feature. In the step S603, the decoder 520 of the user acoustics model 500 is used to receive the feature vector outputted by the encoder 510 of the original-singer acoustics model 500. In the step S604, since the user acoustics model 500 has weighting parameters corresponding to the user, the user acoustics feature (hereinafter, first user acoustics feature) can be obtained from the output of the decoder 520 of the user acoustics model 500. In the step S605, a vocoder (as shown in FIG. 7) is used to convert the first user acoustics feature into the synthesized singing track. Accordingly, the produced continuing singing can maintain the pitch of the original singer, and the produced continuing singing can have the timbre of the user.

Please refer to FIG. 7, illustrating a schematic block diagram of a singing-continuing module 320 according to one embodiment of the instant disclosure. In some embodiments, the singing-continuing module 320 comprises a feature analyzing unit 321 so as to obtain any one sound information of the MFCCs, the fundamental frequency, and the aperiodicity from the original-singer sound segment. The feature analyzing unit 321 comprises several algorithms so as to estimate the aforementioned sound pattern information. For example, the fundamental frequency may be obtained by DIO, YIN, or SWIPE algorithms. In these approaches, waveforms which appear repeatedly are figured out from the sound track, and the time interval between the appearing times of the waveforms are calculated to obtain the required time for each of the waveforms (namely, the period of the waveform), thereby the pitch (fundamental frequency) of the sound track can be calculated using the periods of the waveforms. For example, the aperiodicity may be obtained by Platinum (platform inference by removing underlying material) algorithm. The aperiodicity is the extremely high frequency parts of the sound track. The extremely high frequency parts are parts of the sound track with rapid changes. The Platinum algorithm is to figure out the maximum sound track change value from the sound track, i.e., the aperiodicity. The way to obtain the MFCCs is described as following. The original-singer sound segment is divided into frames and the frames are windowing, and then Fourier Transform (FT) is applied to each of the frames. Next, the transformed frames are stacked to obtain a spectrogram. Then, Mel-scale filter banks are used to convert the spectrogram into a Mel frequency spectrum. And, after a logarithmic processing and an inverse FT are applied to the Mel frequency spectrum, the MFCCs can be obtained.

In some embodiments, the feature analyzing unit 321 may obtain the spectral envelope by using, for example, the CheapTrick algorithm.

As shown in FIG. 7, the MFCCs are inputted to a mixed acoustics model 500' (including the encoder 510 of the original-singer acoustics model 500 and the decoder 520 of the user acoustics model 500), and through the execution of the steps S602 to S604, the first user acoustics feature (in this embodiment, the MFCCs) can be obtained. The vocoder 322 may generate the synthesized singing track according to the MFCCs, but embodiments are not limited thereto; the vocoder 322 may generate the synthesized singing track not only according to the MFCCs but also the fundamental frequency, the aperiodicity (aspirate in human sounds), and the spectral envelope, so that the synthesized singing track can be more natural. Specifically, in this embodiment, the vocoder takes the MFCCs or other user acoustics features (e.g., the fundamental frequency, the spectrum envelope, and the aperiodicity) as inputs, and the vocoder sequentially outputs the value of the waveform of the sound track at each time point (that is, the X axis is the time axis, and the Y axis is the acoustics value at each time point). The spectral envelope are related to the timbre, while the fundamental frequency is related to the pitch. The vocoder 322 and at least one part of the feature analyzing unit 321 may be implemented by the open source software "World" or "Straight", but embodiments are not limited thereto.

Figure 8:
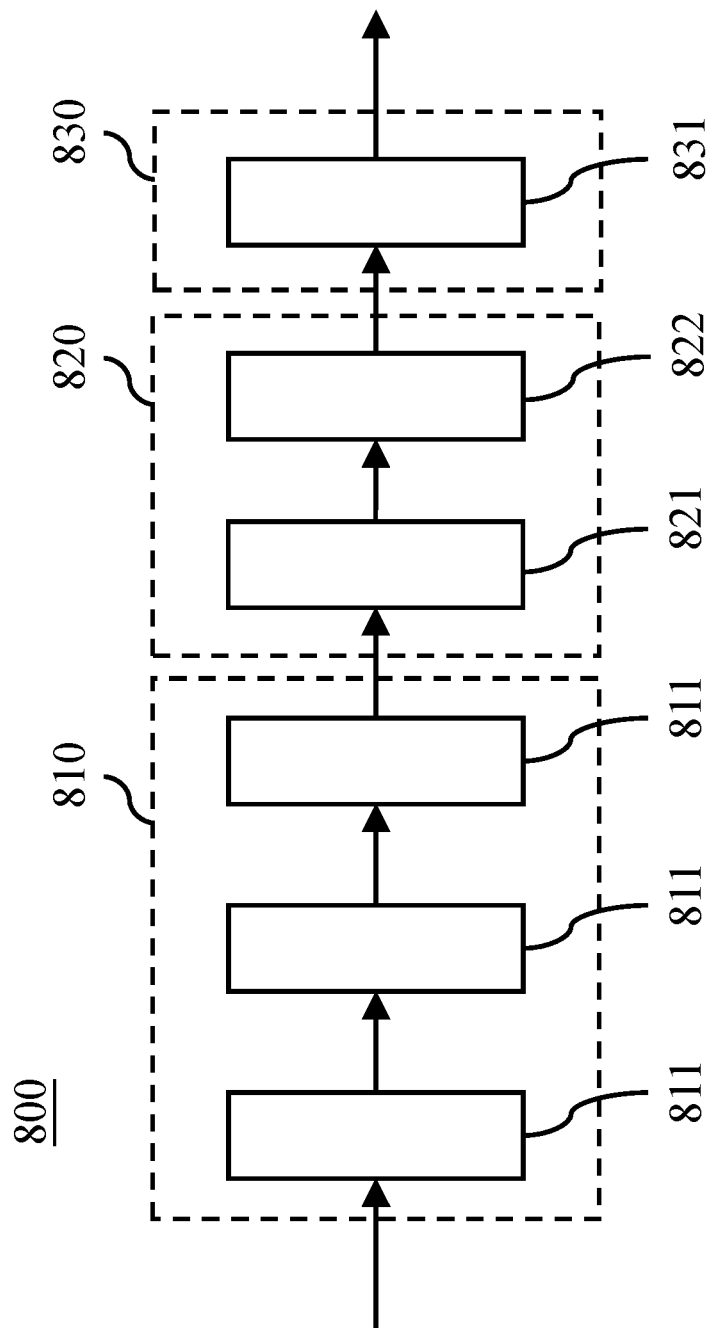
FIG. 8 illustrates a schematic block diagram of a pitch model according to one embodiment of the instant disclosure.

The pitch model used in the pitch adjustment procedure is introduced prior to the introduction of the pitch adjustment procedure. Please refer to FIG. 8, illustrating a schematic block diagram of a pitch model 800 according to one embodiment of the instant disclosure. In this embodiment, the pitch model 800 is a neural network model with supervised learning mode, and the pitch model 800 comprises an encoder 810, a decoder 820, and a PostNet 830. In other words, in this embodiment, the pitch model 800 has an autoencoder structure. The encoder 810 is adapted to convert an inputted acoustics feature into a feature vector, while the decoder 820 is adapted to convert the feature vector into an acoustics feature. The PostNet 830 is adapted to perform an optimization treatment to the acoustics feature. For example, the PostNet can reduce problems regarding the noises of the outputted sound information, the sonic booms, and the discontinuity, thereby improving the quality of the outputted sound information. After a plenty of training data of a certain person is inputted to the pitch model 800, weighting parameters can be converged, and the weighting parameters are accompanied with the pitch model to be a trained pitch model 800 corresponding to the certain person, where the training data is a plenty of sound tracks of the certain person. For example, if a plenty of sound data regarding a user (i.e., the training data of the user) is provided as the training data, the pitch model 800 can be trained as a user pitch model 800; conversely, if a plenty of sound data of a singer (i.e., the training data of the original singer) is provided as the training data, the pitch model 800 can be trained as an original-singer pitch model 800. In other words, pitch models 800 with different weighting parameters can be trained by using training data regarding different person. In this embodiment, regarding the same person, the training data for training the pitch model 800 may be different from the training data for training the acoustics model.

In some embodiments, as shown in FIG. 8, the encoder 810 comprises three convolution layers 811, the decoder 820 comprises a convolution layer 821 and a gated recurrent unit (GRU) 822, and the PostNet 830 comprises a deconvolution layer 831. However, it is understood that the components of the encoder 810, the decoder 820, and the PostNet 830 are not limited to the foregoing elements and combinations.

Figure 9:
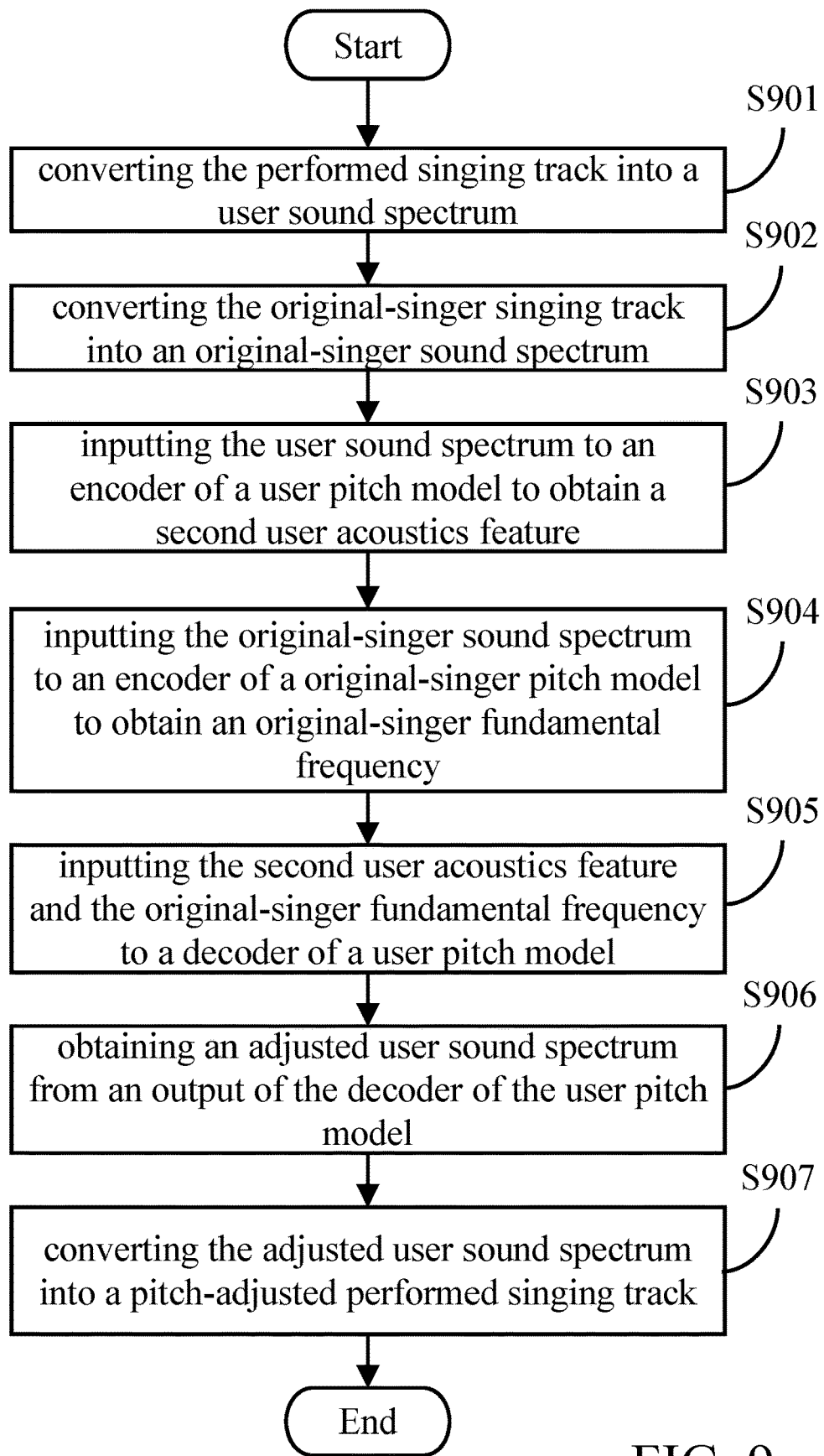
FIG. 9 illustrates a flowchart of a pitch adjustment procedure according to one embodiment of the instant disclosure.
Figure 10:
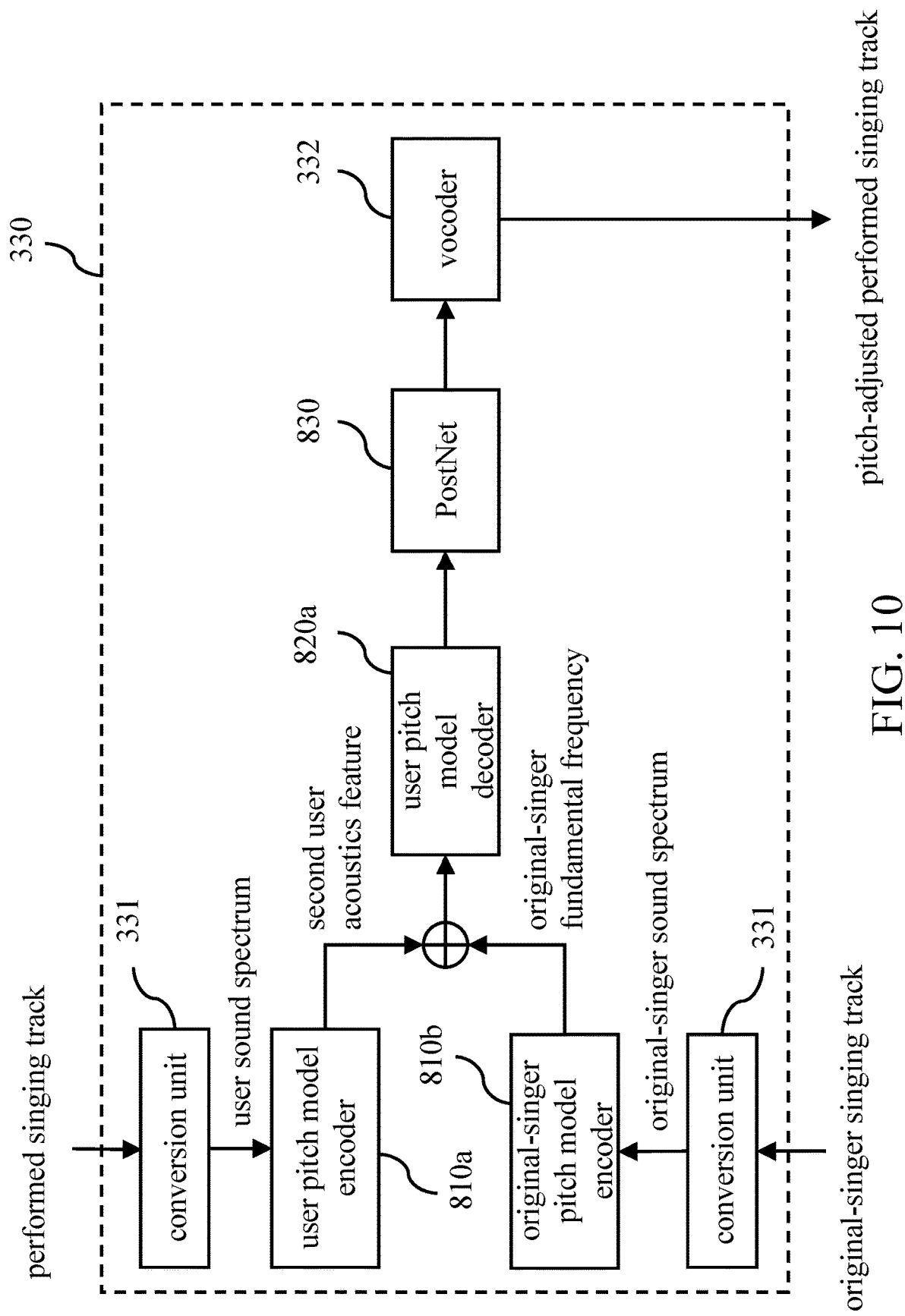
FIG. 10 illustrates a schematic block diagram of a pitch adjustment module according to one embodiment of the instant disclosure.

Please refer to FIGS. 9 and 10. FIG. 9 illustrates a flowchart of a pitch adjustment procedure according to one embodiment of the instant disclosure. FIG. 10 illustrates a schematic block diagram of a pitch adjustment module 330 according to one embodiment of the instant disclosure. In the step S901, the conversion unit 331 is used to convert the performed singing track of the user into a sound spectrum (hereinafter, user sound spectrum). The conversion unit 331 may be implemented by Fourier Transform algorithm or other algorithms capable of performing time domain to frequency domain conversion. In the step S902, the conversion unit 331 is used again to convert the original-singer singing track into a sound spectrum (hereinafter, original-singer sound spectrum). Although two conversion units 331 are illustrated in FIG. 9, it is understood that the step S901 and the step S902 may be executed by one conversion unit 331.

In the step S903, the user sound spectrum is inputted to the encoder 810 of the user pitch model 800 (hereinafter, user pitch model encoder 810a); since the user pitch model 800 has weighting parameters corresponding to the user, a user acoustics feature (hereinafter, second user acoustics feature) can be obtained. In this embodiment, the second user acoustics feature may be one or combinations of the fundamental frequency, the spectral envelope, the aperiodic, and the Mel generalized cepstral coefficients.

In the step S904, the original-singer sound spectrum is inputted to the encoder 810 of the original-singer pitch model 800 (hereinafter, original-singer pitch model encoder 810b); since the original-singer pitch model 800 has weighting parameters corresponding to the original singer, a fundamental frequency of the original-singer (hereinafter, original-singer fundamental frequency) can be obtained.

In some embodiments, the order for executing the step S901 and the step S902 may be exchanged, and the order for executing the step S903 and the step S904 may be exchanged. Furthermore, the order for executing the steps S901 to S904 may be exchanged as long as the step S901 is executed before the execution of the step S903 and as long as the step S902 is executed before the execution of the step S904.

In the step S905, the second user acoustics feature obtained from the step S903 and the original-singer fundamental frequency obtained in the step S904 are inputted to the decoder 820 of the user acoustics model 800 (hereinafter, user pitch model decoder 820a) so as to maintain the tone of the user and the pitch of the original-singer (i.e., the correct pitch).

In the step S906, since the user pitch model 800 has weighting parameters corresponding to the user, the adjusted user sound spectrum can be obtained from the output of the user pitch model decoder 820a.

In the step S907, the vocoder is used to convert the adjusted user sound spectrum into a pitch-adjusted performed singing track, where the vocoder takes the MFCCs or other user acoustics features (e.g., the fundamental frequency, the spectrum envelope, and the aperiodicity) as inputs, and the vocoder sequentially outputs the value of the waveform of the sound track at each time point. The vocoder may be implemented by the open source software "World" or "Straight", but embodiments are not limited thereto. Accordingly, the singing track performed by the user can be adjusted to have the correct pitch with the timbre of the user being maintained In some embodiments, the pitch adjustment module 330 may be implemented by the pitch synchronous overlap add (PSOLA) algorithm. In the PSOLA algorithm, waveforms which appear repeatedly are figured out from the sound track, and the waveforms are added or subtracted to achieve frequency increase or frequency decrease, such that the pitch of the sound track can be adjusted.

In some embodiments, the processing device 120 recognizes the identity of the original singer according to the separated original-singer singing track and loads the original-singer pitch model 800 corresponding to the original singer according to the identity of the original singer.

In some embodiments, the processing device 120 recognizes the identity of the original singer according to the separated original-singer singing track and loads the original-singer acoustics model 500 corresponding to the original singer according to the identity of the original singer.

In some embodiments, the processing device 120 obtains the identity of the original singer from the metadata of the song file or through user input, so that the processing device can load the original-singer acoustics model 500 and the original-singer pitch model 800 corresponding to the original singer.

In some embodiments, the computer program product 300 may be devoid of the music separation module 340 and the sound mixing module 350, and the processing module 120 is adapted to play the accompaniment music without the original-singer singing track. In this condition, the original-singer singing track for the pitch adjustment module 330 can be obtained from the song file stored in the non-transitory computer-readable medium 123 or from another processed singing track file, and the ought-to-be-performed period can be obtained by time stamping.

Accordingly, based on one or some embodiments of the instant disclosure, by detecting if the user performs singing in the ought-to-be-performed period to determine the singing-continuing procedure should be performed or not, a continuing singing can be automatically provided using the sound of the user when the user forgets the lyrics or stop singing for some reasons. By applying the singing-continuing procedure, the produced continuing singing can maintain the pitch of the original singer; furthermore, since the acoustics model has an autoencoder structure, the produced continuing singing can have the timbre of the user. Moreover, by detecting the pitch of the performed singing of the user, the pitch adjustment procedure can be executed when the user is off the pitch. By executing the pitch adjustment procedure, the pitch of the user can be automatically adjusted; further more, since the pitch model has an autoencoder structure, the performed singing can have the timbre of the user.

What is claimed is:

1. A singing assisting method, comprising:
receiving a performed singing track by a sound receiving device;
detecting if the performed singing track appears in an ought-to-be-performed period by a processing device, if not, executing a singing-continuing procedure, wherein the singing-continuing procedure is executed by being accompanied with an acoustics model comprising an encoder and a decoder, the acoustics model is trained by original-singer training data to obtain an original-singer acoustics model, and the acoustics model is trained by user training data to obtain a user acoustics model, the singing-continuing procedure comprises:
 converting an original-singer sound segment into an original-singer acoustics feature;
 inputting the original-singer acoustics feature to the encoder of the original-singer acoustics model;
 receiving an output of the encoder of the original-singer acoustics model by the decoder of the user acoustics model;
 obtaining a first user acoustics feature from an output of the decoder of the user acoustics model; and
 converting the first user acoustics feature into a synthesized singing track by a vocoder; and
outputting the synthesized singing track by a player device.

2. The singing assisting method according to claim 1, wherein if the performed singing track appears in the ought-to-be-performed period, determining if a performed pitch of the performed singing track is in consistent with an original-singer pitch of an original-singer singing track, by the processing device, if not, executing a pitch adjustment procedure to the performed singing track, by the processing device.

3. The singing assisting method according to claim 2, wherein the pitch adjustment procedure is executed by being accompanied with a pitch model comprising a second encoder and a second decoder, the pitch model is trained by the original-singer training data to obtain an original-singer pitch model, and the pitch model is trained by the user training data to obtain a user pitch model, the pitch adjustment procedure comprises:
   converting the performed singing track into a user sound spectrum;
   converting the original-singer singing track into an original-singer sound spectrum;
   inputting the user sound spectrum to the second encoder of the user pitch model to obtain a second user acoustics feature;
   inputting the original-singer sound spectrum to the second encoder of the original-singer pitch model to obtain an original-singer fundamental frequency;
   inputting the second user acoustics feature and the original-singer fundamental frequency to the second decoder of the user pitch model;
   obtaining an adjusted user sound spectrum from an output of the second decoder of the user pitch model; and
   converting the adjusted user sound spectrum into a pitch-adjusted performed singing track.

4. The singing assisting method according to claim 3, further comprising:
   separating a song file into an accompaniment music and the original-singer singing track by the processing device;
   recognizing an identity of an original singer according to the original-singer singing track by the processing device; and
   loading the original-singer pitch model corresponding to the original singer by the processing device, according to the identity of the original singer.

5. The singing assisting method according to claim 1, further comprising:
   separating a song file into an accompaniment music and the original-singer singing track by the processing device.

6. The singing assisting method according to claim 5, further comprising:
   recognizing an identity of an original singer according to the original-singer singing track by the processing device; and
   loading the original-singer acoustics model corresponding to the original singer by the processing device, according to the identity of the original singer.

7. A non-transitory computer-readable medium, comprising a plurality of instructions, wherein when at least one processor of a computer system executes the instructions, the computer system executes steps of:
   detecting if a performed singing track appears in an ought-to-be-performed period, if not, executing a singing-continuing procedure, wherein the singing-continuing procedure is executed by being accompanied with an acoustics model comprising an encoder and a decoder, the acoustics model is trained by original-singer training data to obtain an original-singer acoustics model, and the acoustics model is trained by user training data to obtain a user acoustics model, the singing-continuing procedure comprises:
   converting an original-singer sound segment into an original-singer acoustics feature;
   inputting the original-singer acoustics feature to the encoder of the original-singer acoustics model;
   receiving an output of the encoder of the original-singer acoustics model by the decoder of the user acoustics model;
   obtaining a first user acoustics feature from an output of the decoder of the user acoustics model; and
   converting the first user acoustics feature into a synthesized singing track by a vocoder.

8. The non-transitory computer-readable medium according to claim 7, wherein if the performed singing track appears in the ought-to-be-performed period, the computer system executes the instructions to determine if a performed pitch of the performed singing track is in consistent with an original singer pitch of an original-singer singing track, if not, the computer system executes the instructions to perform a pitch adjustment procedure to the performed singing track.

9. The non-transitory computer-readable medium according to claim 8, wherein the pitch adjustment procedure is executed by being accompanied with a pitch model comprising a second encoder and a second decoder, the pitch model is trained by the original-singer training data to obtain an original-singer pitch model, and the pitch model is trained by the user training data to obtain a user pitch model, the pitch adjustment procedure comprises:
   converting the performed singing track into a user sound spectrum;
   converting the original-singer singing track into an original-singer sound spectrum;
   inputting the user sound spectrum to the second encoder of the user pitch model to obtain a second user acoustics feature;
   inputting the original-singer sound spectrum to the second encoder of the original-singer pitch model to obtain an original-singer fundamental frequency;
   inputting the second user acoustics feature and the original-singer fundamental frequency to the second decoder of the user pitch model;
   obtaining an adjusted user sound spectrum from an output of the second decoder of the user pitch model; and
   converting the adjusted user sound spectrum into a pitch-adjusted performed singing track.

10. The non-transitory computer-readable medium according to claim 9, wherein the steps executed by the computer system further comprise:
    separating a song file into an accompaniment music and the original-singer singing track;
    recognizing an identity of an original singer according to the original-singer singing track; and
    loading the original-singer pitch model corresponding to the original singer, according to the identity of the original singer.

11. The non-transitory computer-readable medium according to claim 7, wherein the steps executed by the computer system further comprise:
    separating a song file into an accompaniment music and the original-singer singing track.

12. The non-transitory computer-readable medium according to claim 11, wherein the steps executed by the computer system further comprise:

recognizing an identity of an original singer according to the original-singer singing track; and loading the original-singer acoustics model corresponding to the original singer, according to the identity of the original singer.

13. A singing assisting system, comprising:

a sound receiving device, adapted to receive a performed singing track of a user;

a processing device, adapted to detect if the performed singing track appears in an ought-to-be-performed period, if not, the processing device executing a singing-continuing procedure, wherein the singing-continuing procedure is executed by being accompanied with an acoustics model comprising an encoder and a decoder, the acoustics model is trained by original-singer training data to obtain an original-singer acoustics model, and the acoustics model is trained by user training data to obtain a user acoustics model, the singing-continuing procedure comprises:

converting an original-singer sound segment into an original-singer acoustics feature;

inputting the original-singer acoustics feature to the encoder of the original-singer acoustics model;

receiving an output of the encoder of the original-singer acoustics model by the decoder of the user acoustics model;

obtaining a first user acoustics feature from an output of the decoder of the user acoustics model; and converting the first user acoustics feature into a synthesized singing track by a vocoder; and a player device adapted to output the synthesized singing track.

14. The singing assisting system according to claim 13, wherein if the performed singing track appears in the ought-to-be-performed period, the processing device determines if a performed pitch of the performed singing track is in consistent with an original-singer pitch of an original-singer singing track, if not, the processing device executes a pitch adjustment procedure to the performed singing track.

15. The singing assisting system according to claim 14, wherein the pitch adjustment procedure is executed by being accompanied with a pitch model comprising a second encoder and a second decoder, the pitch model is trained by the original-singer training data to obtain an original-singer pitch model, and the pitch model is trained by the user training data to obtain a user pitch model, the pitch adjustment procedure comprises:

converting the performed singing track into a user sound spectrum;

converting the original-singer singing track into an original-singer sound spectrum;

inputting the user sound spectrum to the second encoder of the user pitch model to obtain a second user acoustics feature;

inputting the original-singer sound spectrum to the second encoder of the original-singer pitch model to obtain an original-singer fundamental frequency;

inputting the second user acoustics feature and the original-singer fundamental frequency to the second decoder of the user pitch model;

obtaining an adjusted user sound spectrum from an output of the second decoder of the user pitch model; and converting the adjusted user sound spectrum into a pitch-adjusted performed singing track.

16. The singing assisting system according to claim 15, wherein the processing device further separates a song file into an accompaniment music and the original-singer singing track, recognizes an identity of an original singer according to the original-singer singing track, and loading the original-singer pitch model corresponding to the original singer according to the identity of the original singer.

17. The singing assisting system according to claim 13, wherein the processing device further separates a song file into an accompaniment music and the original-singer singing track.

18. The singing assisting system according to claim 17, wherein the processing device recognizes an identity of an original singer according to the original-singer singing track, and the processing device loads the original-singer acoustics model corresponding to the original singer according to the identity of the original singer.

19. A singing assisting method, comprising:

receiving a performed singing track by a sound receiving device;

determining if a performed pitch of the performed singing track is in consistent with an original-singer pitch of an original-singer singing track, if not, executing a pitch adjustment procedure to the performed singing track, wherein the pitch adjustment procedure is executed by being accompanied with a pitch model comprising a encoder and a decoder, the pitch model is trained by the original-singer training data to obtain an original-singer pitch model, and the pitch model is trained by the user training data to obtain a user pitch model, the pitch adjustment procedure comprises:

converting the performed singing track into a user sound spectrum;

converting the original-singer singing track into an original-singer sound spectrum;

inputting the user sound spectrum to the encoder of the user pitch model to obtain a user acoustics feature;

inputting the original-singer sound spectrum to the encoder of the original-singer pitch model to obtain an original-singer fundamental frequency;

inputting the user acoustics feature and the original-singer fundamental frequency to the decoder of the user pitch model;

obtaining an adjusted user sound spectrum from an output of the decoder of the user pitch model; and converting the adjusted user sound spectrum into a pitch-adjusted performed singing track; and outputting the synthesized singing track by a player device.

20. A non-transitory computer-readable medium, comprising a plurality of instructions, wherein when at least one processor of a computer system executes the instructions, the computer system executes steps of:

determining if a performed pitch of the performed singing track is in consistent with an original-singer pitch of an original-singer singing track, if not, executing a pitch adjustment procedure to the performed singing track, wherein the pitch adjustment procedure is executed by being accompanied with a pitch model comprising a encoder and a decoder, the pitch model is trained by the original-singer training data to obtain an original-singer pitch model, and the pitch model is trained by the user training data to obtain a user pitch model, the pitch adjustment procedure comprises:

converting the performed singing track into a user sound spectrum;

converting the original-singer singing track into an original-singer sound spectrum;

inputting the user sound spectrum to the encoder of the user pitch model to obtain a user acoustics feature;

inputting the original-singer sound spectrum to the encoder of the original-singer pitch model to obtain an original-singer fundamental frequency;

inputting the user acoustics feature and the original-singer fundamental frequency to the decoder of the user pitch model;

obtaining an adjusted user sound spectrum from an output of the decoder of the user pitch model; and converting the adjusted user sound spectrum into a pitch-adjusted performed singing track.

21. A singing assisting system, comprising:

a sound receiving device, adapted to receive a performed singing track of a user;

a processing device, adapted to determine if a performed pitch of the performed singing track is in consistent with an original-singer pitch of an original-singer singing track, if not, the processing device executes a pitch adjustment procedure to the performed singing track, wherein the pitch adjustment procedure is executed by being accompanied with a pitch model comprising a encoder and a decoder, the pitch model is trained by the original-singer training data to obtain an original-singer pitch model, and the pitch model is trained by the user training data to obtain a user pitch model, the pitch adjustment procedure comprises:

converting the performed singing track into a user sound spectrum;

converting the original-singer singing track into an original-singer sound spectrum;

inputting the user sound spectrum to the encoder of the user pitch model to obtain a user acoustics feature;

inputting the original-singer sound spectrum to the encoder of the original-singer pitch model to obtain an original-singer fundamental frequency;

inputting the user acoustics feature and the original-singer fundamental frequency to the decoder of the user pitch model;

obtaining an adjusted user sound spectrum from an output of the decoder of the user pitch model; and converting the adjusted user sound spectrum into a pitch-adjusted performed singing track; and a player device adapted to output the pitch-adjusted performed singing track.

\* \* \* \* \*